(12) United States Patent
Willis (10) Patent No.: US 10,160,372 B2
(45) Date of Patent: *Dec. 25, 2018

(54) TRAILERS FOR TOWING VEHICLES AND RELATED METHODS

(71) Applicant: TD Concepts, LLC, Pickens, SC (US)

(72) Inventor: Nicklaus Willis, Pickens, SC (US)

(73) Assignee: TD CONCEPTS, LLC, Pickens, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,398

(22) Filed: Mar. 1, 2018

(65) Prior Publication Data

US 2018/0186273 A1 Jul. 5, 2018

Related U.S. Application Data

(63) Continuation of application No. 15/423,122, filed on Feb. 2, 2017, now Pat. No. 9,937,847.

(60) Provisional application No. 62/293,354, filed on Feb. 10, 2016, provisional application No. 62/290,216, filed on Feb. 2, 2016.

(51) Int. Cl.
  *B60P 1/43* (2006.01)
  *B60P 3/077* (2006.01)
  *B62D 63/06* (2006.01)

(52) U.S. Cl.
  CPC ............... *B60P 3/077* (2013.01); *B60P 1/438* (2013.01); *B62D 63/062* (2013.01); *B60P 1/43* (2013.01)

(58) Field of Classification Search
  CPC ........... B60P 1/43; B60P 1/433; B60P 1/4428; B62D 63/062
  USPC ......................... 414/481, 482, 483, 537, 485
  See application file for complete search history.

(56) References Cited

U.S. PATENT DOCUMENTS

| | | | |
|---|---|---|---|
| 4,514,132 A | 4/1985 | Law | |
| 4,592,564 A | 6/1986 | Warnock | |
| 4,792,274 A | 12/1988 | Cockram | |
| 5,033,931 A * | 7/1991 | Mann | B60P 1/24 414/480 |
| 5,234,307 A | 8/1993 | Scott | |
| 5,857,825 A * | 1/1999 | Rice | B60P 1/24 414/483 |
| 6,139,247 A | 10/2000 | Wright | |
| 6,241,450 B1 * | 6/2001 | Gehman | B60P 3/07 414/469 |
| 7,011,485 B2 | 3/2006 | Henry | |
| 7,909,355 B2 * | 3/2011 | Thedford | B60P 3/07 280/491.1 |

(Continued)

*Primary Examiner* — James R Bidwell
(74) *Attorney, Agent, or Firm* — Andrew R. Shores; Williams Mullen (57) ABSTRACT

A trailer for towing vehicles and related methods is presented. The disclosed trailer can be configured for towing certain three-wheeled vehicles and include a ramp, a front wheel retaining member, and rear wheel plates. The trailer may be configured to receive a three-wheeled vehicle, and upon receipt of the front wheel at the front wheel retaining member and the rear wheels at the rear wheel plates, transition from a first position with the ramp in a lowered configuration to a second position with the ramp in a raised and locked configuration, wherein the weight of the vehicle being towed may be used to both raise the ramp and maintain the ramp in a secured, raised configuration.

20 Claims, 11 Drawing Sheets

(56) References Cited

U.S. PATENT DOCUMENTS

2004/0265083 A1\* 12/2004 Johnson ................ B60P 3/077
410/30
2009/0295124 A1   12/2009 Badry \* cited by examiner

TRAILERS FOR TOWING VEHICLES AND RELATED METHODS

CROSS-REFERENCE TO RELATED APPLICATIONS

This application is a continuation of U.S. application Ser. No. 15/423,122 filed Feb. 2, 2017 titled Trailers for Towing Vehicles and Related Methods, which claims priority to U.S. Provisional Patent Application No. 62/290,216 filed Feb. 2, 2016, titled Trailers For Towing Vehicles and Related Methods, and which also claims priority to U.S. Provisional Patent Application No. 62/293,354 filed Feb. 10, 2016 titled Trailers For Towing Vehicles and Related Methods; the entire disclosures of both provisional applications and the non-provisional application are incorporated herein by reference.

STATEMENT REGARDING GOVERNMENT SUPPORT

None.

FIELD OF THE INVENTION

The present disclosure relates to trailers for towing vehicles and related methods. In particular, the present disclosure related to trailer for towing three-wheeled vehicles that provide total support of the vehicles while permitting easy loading and unloading of the vehicles.

BACKGROUND OF THE INVENTION

Landscaping equipment and vehicles used to maintain golf courses are often three-wheeled vehicles with two rear wheels and a centered forward wheel that permits for, among other things, tight turning radiuses and improved maneuverability in tight quarters. Such three wheeled vehicles can be designed to perform specific tasks, such as for example mowing, or can be configured to accept different attachments or implements and perform a wide variety of tasks. Generally speaking, such three-wheeled vehicles are designed to perform one or more tasks within a given intended area or job site, but are not well-suited to travel over long distances under their own power. Thus, such three-wheeled vehicles are often towed by other vehicles to a job site where they may be utilized for their desired function and are then towed to other job sites or a storage area once the task is completed.

To tow such three-wheeled vehicles, numerous methods and devices may be employed. In one example, a small trailer that includes a single platform may be utilized whereby the front wheel may be secured to the trailer and the remaining wheels remain on the ground. Such towing may be acceptable for three-wheeled vehicles with freely rotating back wheels, but may not be acceptable if the three-wheeled vehicle includes, for example, a geared transmission system or hydraulic drive system that prevents or otherwise makes undesirable free rotation of the back wheels. In such cases, other types of trailers must be utilized, including trailers wherein the three-wheeled vehicles must be fully driven onto, for example, full length trailers. Such trailers are often heavy, difficult to maneuver, and otherwise undesirable in certain applications (such as, for example, golf courses or other landscaping applications).

Accordingly, there exists a need for improved trailers that may be used to easily tow three-wheeled vehicles, and/or other types of vehicles (including for example two wheeled vehicles or four or more wheeled vehicles) without the need for heavy and poorly maneuverable full length trailers or the like.

SUMMARY OF THE INVENTION

In some embodiments, a trailer for towing a three-wheeled vehicle having a front wheel and two rear wheels is presented. The trailer may include one or more of a tongue assembly, a ramp assembly, and a bed assembly spanning substantially along a longitudinal axis between the tongue assembly and the ramp assembly. In some embodiments, the front wheel securing assembly may include a front wheel receiver pivotable about a front wheel receiver pivot axis. The trailer may also include a ramp assembly having one or more of a ramp and a ramp pivot axis disposed substantially perpendicular to the longitudinal axis, wherein the ramp pivot axis divides the ramp into a forward ramp portion disposed proximate the front wheel securing assembly and a rear ramp portion opposite thereto. The ramp may be configured to pivot about the ramp pivot axis, and may also include one or more wheel rest plates. In some embodiments, the front wheel receiver and the ramp may pivot from a first position to a second position upon receipt of the rear wheels at the wheel rest plates. In some embodiments, a downward force provided by the rear wheels may pivot the ramp from the first position to the second position. The second position may be substantially aligned with the longitudinal axis.

In certain embodiments, the trailer may also include one or more rear wheel stops, each optionally having a substantially semi-circular radius. The trailer may also include a front wheel receiver pivot bar and a ramp pivot bar. In some embodiments, the width of the bed assembly is sufficiently wide enough to receive a front wheel of a vehicle or the front wheels of the vehicle (depending on vehicle type), but narrower than the ramp assembly so as to, among other things, minimize materials and weight in the trailer.

In some embodiments, the tongue assembly may be adjustable such that the length of the tongue may be adjusted as needed by the user depending on the application. In some embodiments, the tongue assembly may include a tongue bar and tongue bar receiver, wherein the tongue bar includes adjustment holes configured to align with a lock point on the tongue bar receiver.

In some embodiments, the trailer may also include a manual hoist point (e.g., a T-bar) for manually maneuvering the trailer, and may also include an adjustable stand for use when the trailer is not, for example, secured to a towing vehicle.

The trailer may also, in some embodiments, include a securing mechanism such as, for example, a ratchet strap assembly, strap, and hook for securing a vehicle positioned on the trailer with the trailer itself for transport.

In certain other embodiments, variants of the present disclosure are contemplated wherein the vehicle to be installed on the trailer comprises a plurality of wheels (e.g., two, three, or more) and the trailer includes wheel receiving mechanisms for securing such vehicles to the trailer in a similar manner. Methods for installing a vehicle on the presently disclosed trailer are also presented.

DETAILED DESCRIPTION OF EMBODIMENTS

The present disclosure relates generally to trailers for towing vehicles and related methods, and more particularly to trailers for towing three-wheeled vehicles that provide total support of the vehicles while permitting easy loading and unloading.

Unless otherwise defined, terms used herein should be construed to have the same meaning as commonly understood by one of ordinary skill in the art to which this disclosure belongs. It will be further understood that terms used herein should be interpreted as having a meaning that is consistent with their meaning in the context of this specification and the relevant art. Further, the use of any term in this disclosure in one tense or context shall not be limited to only the tense or context of the term as used.

Unless the absence of one or more elements is specifically recited, the terms "comprising," "including," and "having" as used herein should be interpreted as open-ended terms that do not preclude the presence of one or more elements.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations in use or operation in addition to the orientation depicted in the figures.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) and phrases used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/− twenty percent (20%). The terms "about," "somewhat," etc., with respect to structural or functional inter-relations apart from values or numbers are used to convey that an absolute inter-relation is not required, so as the elements satisfy the described purpose within such inter-relation.

Figure 1:
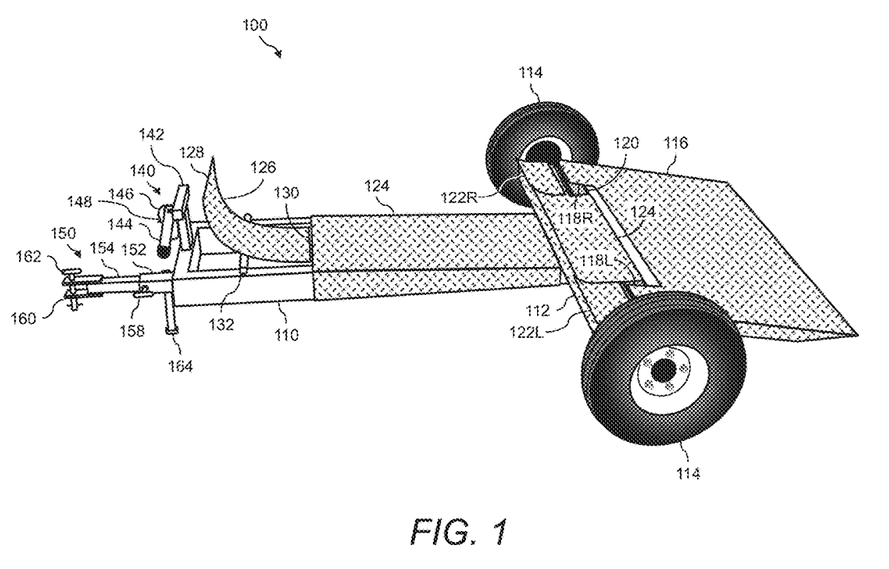
FIG. 1 and FIG. 2 illustrate a side perspective view and a rear perspective view, respectively, of an example of the presently disclosed trailer for hauling a three-wheeled vehicle, wherein the features of the trailer are shown in an unloaded state.
Figure 2:
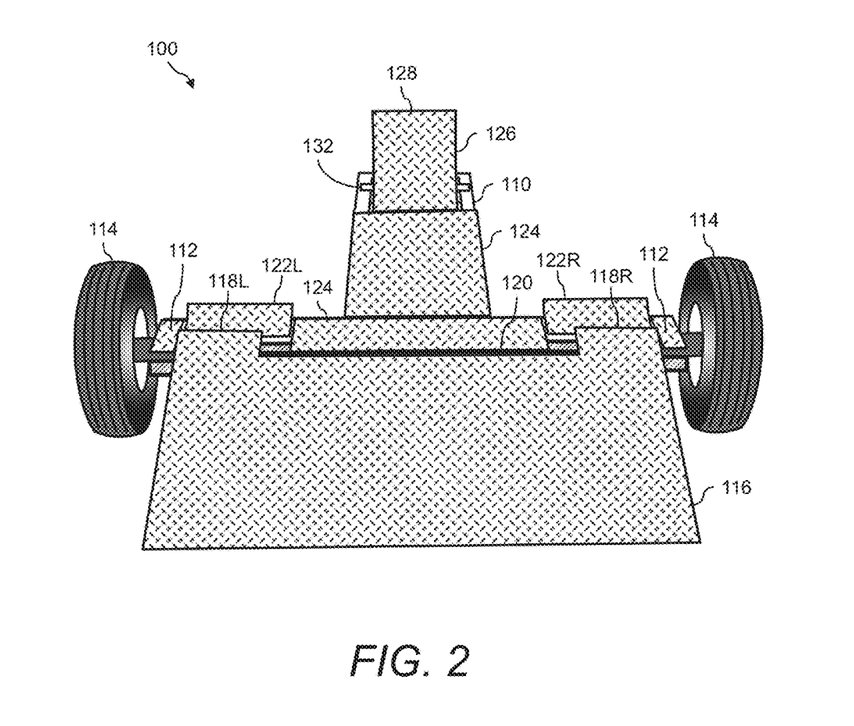
Figure 3:
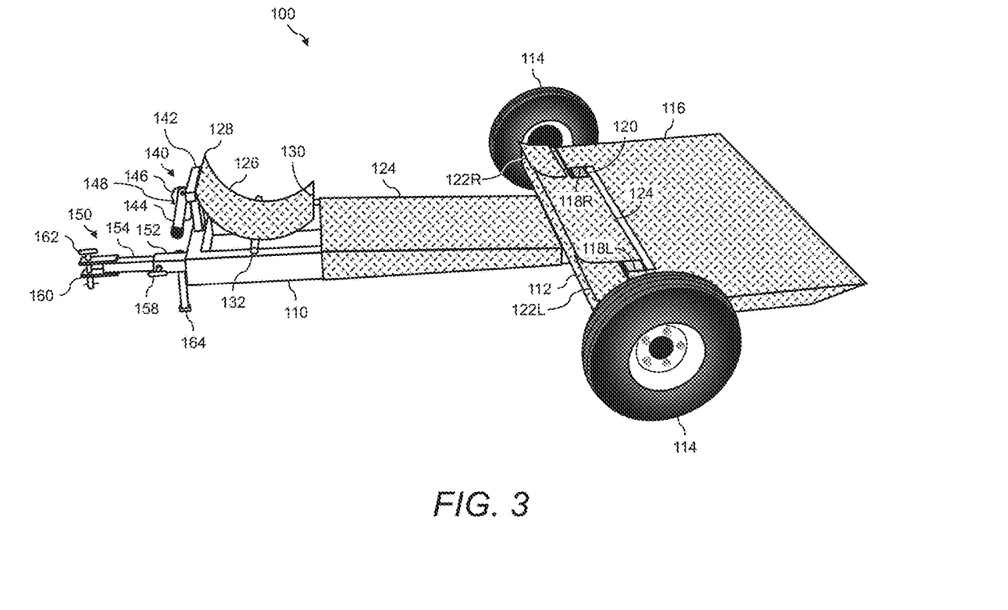
FIG. 3 illustrates a side perspective view of the presently disclosed trailer, wherein the features of the trailer are shown in a loaded state.

Referring now to FIG. 1, a side perspective view and rear perspective view, respectively, of an example of the presently disclosed trailer 100 is presented with the trailer in an unloaded state. In some embodiments, the trailer 100 may include, among other things, a trailer frame 110, an axel member 112, and two or more wheels 114. In some embodiments, trailer 100 may also include a ramp plate 116, wheel rest plates 118R and 118L, wheel stops 122R and 122L, trailer floor plates 124, and front wheel cradle 126. The trailer 110 may also a cradle pivot bar 132 configured to enable front wheel cradle 126 to pivot about bar 132, and a ramp pivot bar 120 configured to enable ramp plate 116 to pivot about bar 120. For example, front wheel cradle 126 and ramp plate 116 may pivot from a first position (e.g. an unloaded position) depicted in FIG. 1 and FIG. 2 to a second position (e.g. a loaded position) depicted in FIG. 3. Ramp plate 116 may also include an angled underside portion configured to lie flat on a surface (e.g. surface 172 in FIG. 8) when the ramp is the first (unloaded) position.

Figure 4:
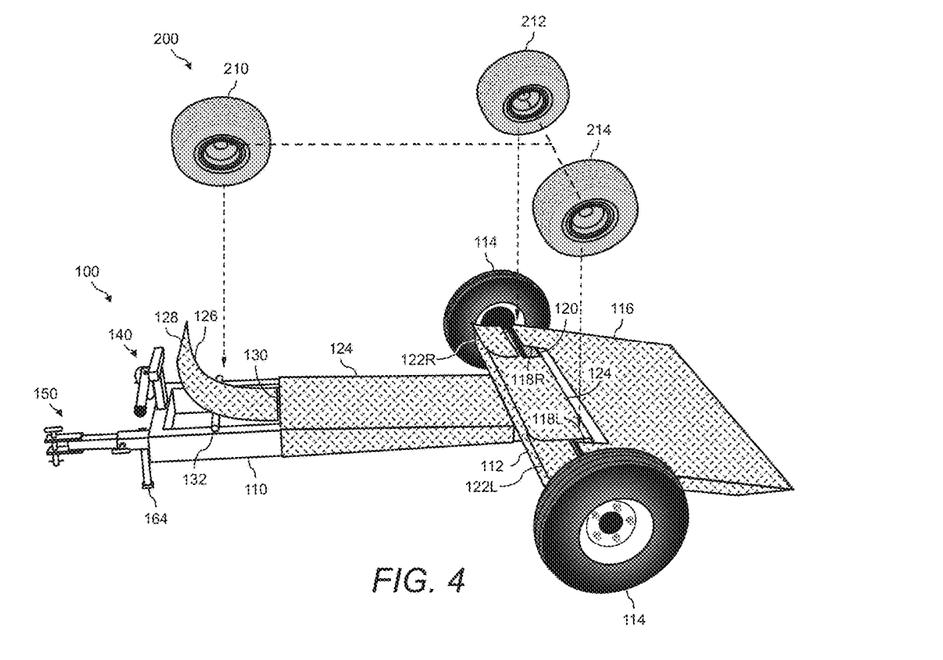
FIG. 4 illustrates a side perspective view of the presently disclosed trailer in the unloaded state and in relation to a three-wheeled vehicle configuration.

Referring now to FIG. 4, an exemplary three-wheeled vehicle configuration 200 is presented in relation to trailer 100. Three-wheeled vehicle configuration 200 is presented for exemplary purposes only and is in no way intended to limit the present disclosure. As shown in FIG. 4, trailer 100 may be configured to substantially align with three-wheeled vehicle configuration 200 such that the front wheel 210 of three-wheeled vehicle configuration 200 substantially aligns with front wheel cradle 126, and rear wheels 212 and 214 of three-wheeled vehicle configuration 200 substantially align with wheel rest plates 118R and 118L and wheel stops 122R and 122L. It will be appreciated by those having skill in the art that trailer 100 may include any configuration that corresponds to any three-wheeled configuration 200 and may be configured to correspond to any relative positions of wheels 210, 212, and 214. It will also be appreciated that the present disclosure is not limited to a trailer for carrying three-wheeled vehicles, but also includes four wheeled configurations, and five or more wheeled configurations.

Figure 5:
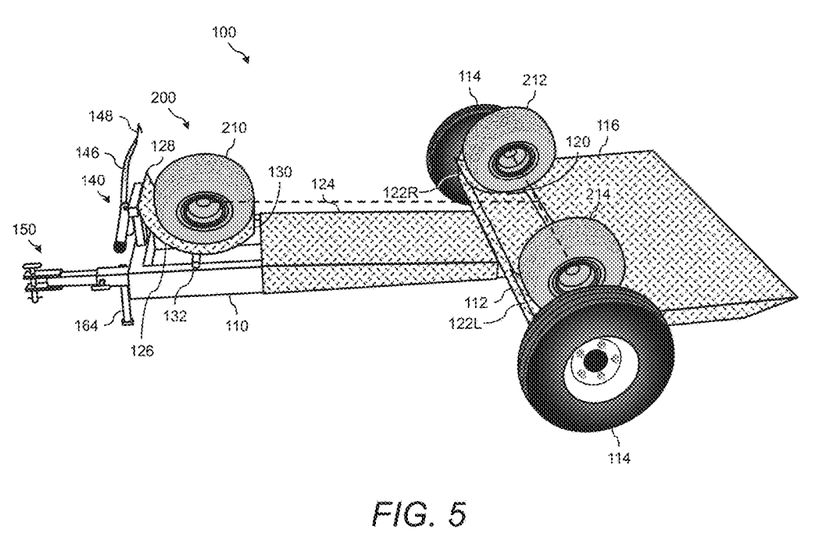
FIG. 5 illustrates a side perspective view of the presently disclosed trailer loaded with the three-wheeled vehicle configuration.

Referring now to FIG. 5, trailer 100 is presented in a loaded state whereby front wheel cradle 126 and ramp plate 116 have pivoted from their respective first positions to their respective second positions. In some embodiments, front wheel cradle 126 may include a front edge 128, a rearward edge 130, and a radius of curvature between edges 128 and 130 substantially similar to that of front wheel 210. This radius of curvature can front wheel 210 to seat securely in front wheel cradle 126 and prevent unwanted movement of front wheel 210. Front wheel cradle 126 may also, alone or on combination with wheel stops 122R and 122L, provide a forward-most stopping position for three-wheeled configuration 200.

Figure 8A:
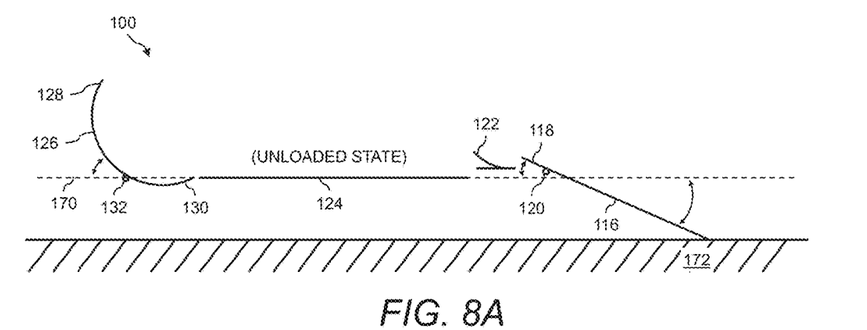
FIG. 8A and FIG. 8B illustrate schematic side views of the presently disclosed trailer in the unloaded and loaded states, respectively.
Figure 8B:
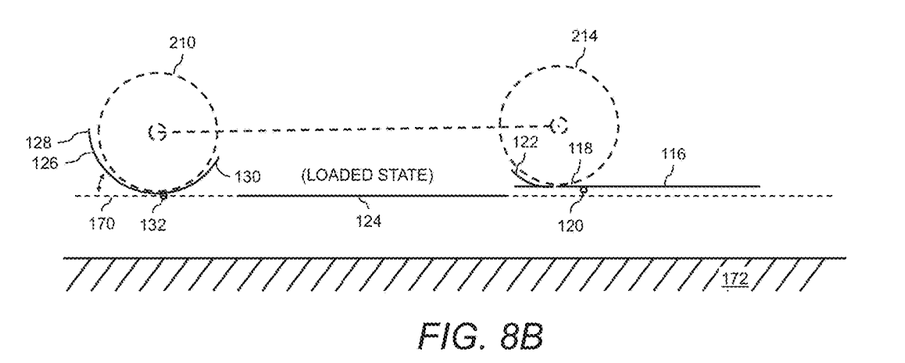

Referring now to FIG. 8, an alternative view of trailer 100 is presented. For example, in FIG. 8A, trailer 100 is presented in an unloaded state with front wheel cradle 126 and ramp plate 116 in their respective first positions. In this first position, ramp plate 116 may be positioned on a ground surface 172 in a manner to receive, for example, a vehicle with three-wheeled configuration 200. In FIG. 8B, trailer 100 is presented in a loaded state with front wheel 210 secured in front wheel cradle 126, and rear wheels 212 and 214 positioned on wheel rest plates 118R and 118L and wheel stops 122R and 122L.

Referring now to FIG. 9, three-wheeled configuration 200 is depicted at various points in the state of loading the trailer 100. Referring first to FIG. 9A, front wheel 210 is traveling up ramp plate 116 and rear wheels 212 and 214 remain on surface 172. At FIG. 9B, front wheel 210 may now be traveling along trailer floor plates 124 with rear wheels 212 and 214 traveling up ramp plate 116 and no longer in contact with ground 172.

Figure 9A:
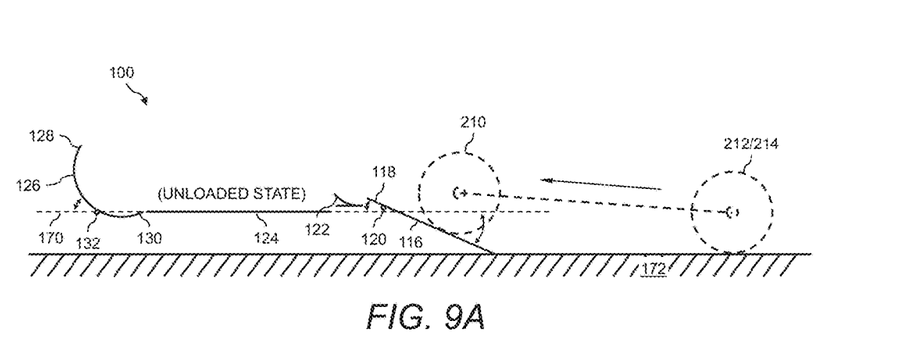
FIG. 9A, FIG. 9B, FIG. 9C, and FIG. 9D illustrate schematic side views showing a process of loading a three-wheeled vehicle on the presently disclosed trailer.
Figure 9B:
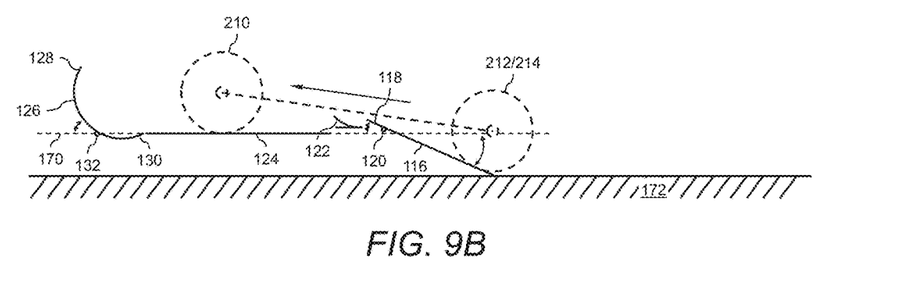
Figure 9C:
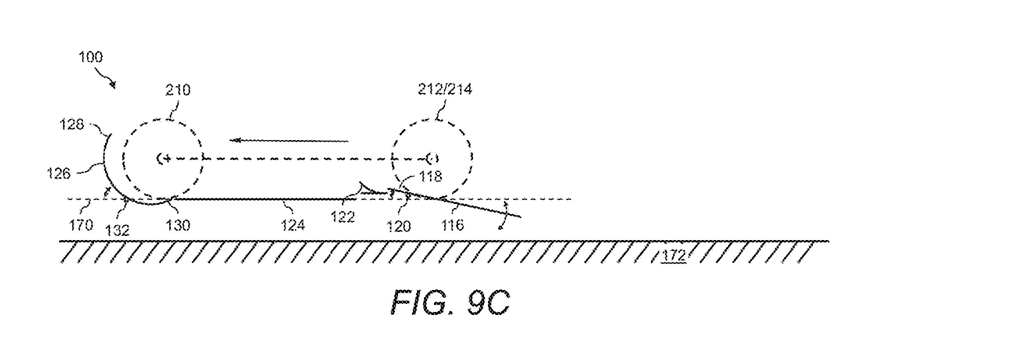
Figure 9D:
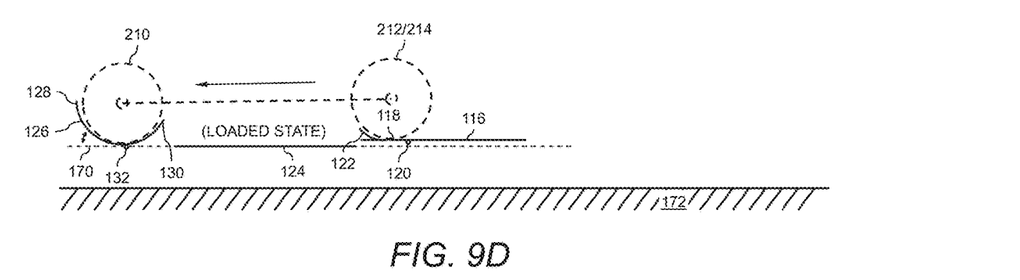

At FIG. 9C, trailer 100 is depicted in a state of transitioning from the first unloaded position to the second loaded configuration. Advantageously, in some embodiments, upon reaching wheel rest plates 118L and 118R, wheels 212 and 214 may provide a downward force (from, for example, the vehicle to which the three-wheeled configuration 200 is a part) that may cause ramp plate 116 to pivot from its first position to its second position. Finally, at FIG. 9D, wheel 210 is seated in front wheel cradle 126 and wheels 212 and 214 are seated on wheel rest plates 118L and 118R and wheel stops 122L and 122R. In this loaded state, ramp plate 116 may be substantially aligned along an axis 170, thereby providing sufficient clearance between ramp plate 116 and ground 172 and enabling transport of the trailer 100 and vehicle thereon.

Figure 6:
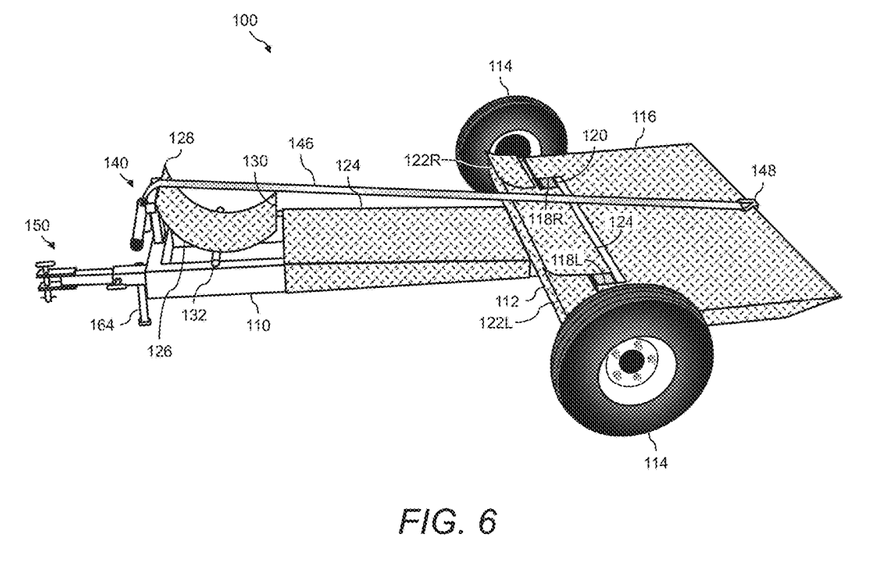
FIG. 6 illustrates a side perspective view of the presently disclosed trailer held in the loaded state using a strap.

In some embodiments, trailer 100 may also include a strap assembly 140. Referring now to FIG. 5, strap assembly 140 may include ratchet strap mechanism 144, strap 146, and hood 148. In some embodiments, when a vehicle (e.g. a vehicle having three-wheeled configuration 200) is loaded on trailer 100, hook 148 may be coupled to the vehicle and ratchet mechanism 144 may be used to tighten strap 146. Accordingly, the strap assembly 140 may provide a mechanism for securing the vehicle to the trailer 100, thereby preventing the vehicle from undesirably moving or shifting during transport. Referring now to FIG. 6, strap assembly 140 may also be used to secure ramp plate 116 in its second position, thereby enabling for example transport of the trailer 100 without a vehicle loaded thereon.

Figures 7A, 7B:
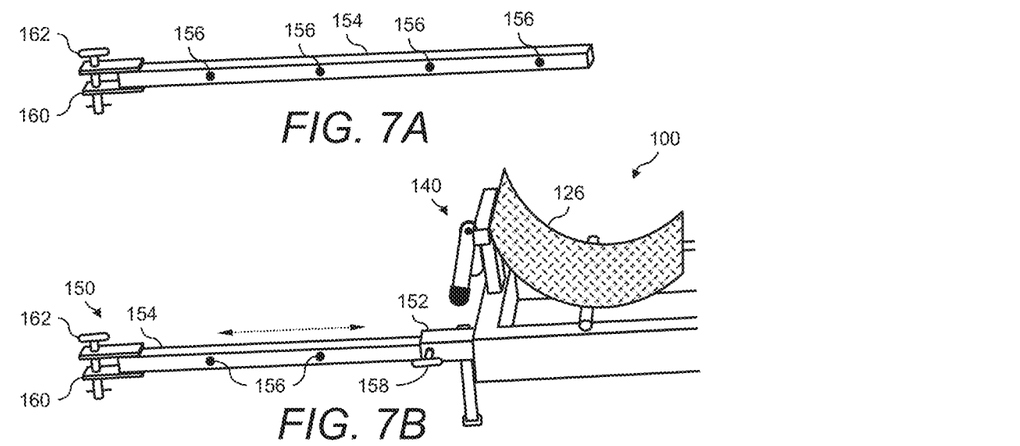
FIG. 7A, FIG. 7B, and FIG. 7C illustrate an example of a telescoping tongue feature of the presently disclosed trailer.
Figure 7C:
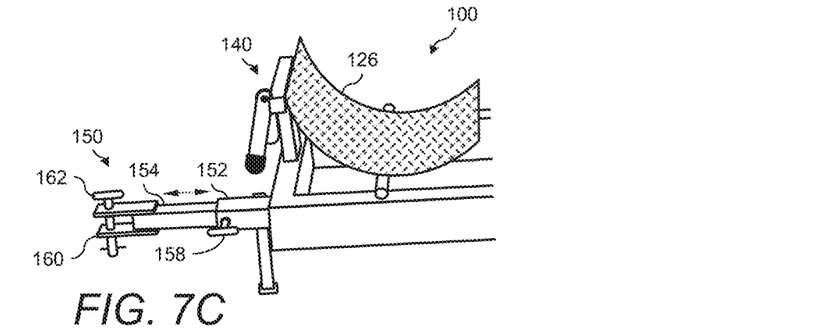

Referring now to FIG. 7, additional features of the present disclosure are presented. In some embodiments, for example, trailer 100 may include a tongue assembly 150. Referring now to FIG. 7A and FIG. 7B, tongue assembly 150 may include tongue receiving member 152, tongue bar 154, holes 156, and tongue pin 158. In some embodiments, tongue assembly 150 is adjustable such that the length of the tongue bar 154 may be varied according as desired (for example, depending upon what type of vehicle is towing trailer 100). For example, tongue bar 154 may include one or more holes 156 (see FIG. 7A). Tongue bar 154 may be inserted in tongue receiving member 152 (FIG. 7B) and the length of tongue bar 154 may be adjusted by a user by, for example, securing tongue pin 158 into the desired hole 156. For example, FIG. 7B illustrates a relatively extended tongue length. FIG. 7C, on the other hand, illustrates a relatively short tongue length.

Trailer 100 may also include hitch 160 and hitch pin 162. In some embodiments, hitch 160 may be configured to mate with a hitch receiver on a vehicle (not shown) for towing trailer 100. Hitch pin 162 may be utilized to securely couple hitch 160 to the towing vehicle. Trailer 100 may also include a T-bar 142 that may be utilized for, among other things, maneuvering trailer 100 by hand when not secured to a towing vehicle. Adjustable stand 164 may also be included for keeping tongue assembly 150 off the ground when trailer 100 is not secured to a towing vehicle.

Figure 10:
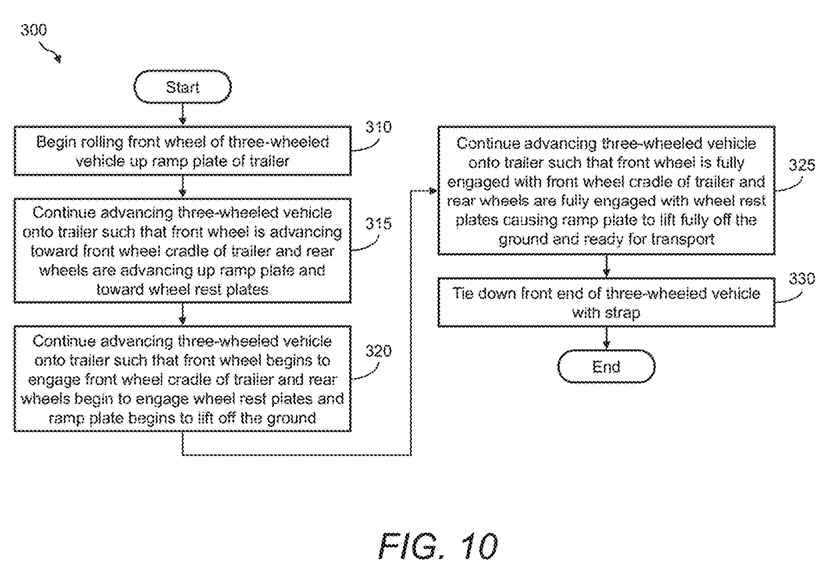
FIG. 10 illustrates a flow diagram of an example of a method of using the presently disclosed trailer for hauling a three-wheeled vehicle.

Referring now to FIG. 10, an exemplary method for using a trailer 100 is presented. In some embodiments, a user may begin with trailer 100 in an unloaded state or first position. At step 310, user may begin rolling a vehicle (e.g., a vehicle having three-wheeled configuration 200) toward and up ramp plate 116, with the front wheel or wheels reaching and rolling up ramp plate 116 first.

At step 315, a user may continue advancing the vehicle onto the trailer such that the front wheel(s) is advancing toward the front wheel cradle of trailer 100 and the rear wheel(s) advance from the ground to the ramp plate 116 and being advancing up the ramp plate 116 towards wheel rest plates 118L and 118R.

At step 320, a user may continue advancing the vehicle onto the trailer=100 such that the front wheel(s) begins to engage the front wheel cradle 126 of trailer 100 and the rear wheel(s) begin to engage wheel rest plates 118L and 118R and ramp plate 116 beings to pivot about ramp pivot bar 120 and move away from ground 172.

At step 325, a user may continue advancing the vehicle onto the trailer 100 such that the front wheel(s) is fully engaged with front wheel cradle 126 of trailer 100 and rear wheel(s) are fully engaged with wheel rest plates 118L and 118R such that ramp plate 116 is fully lifted off of the ground 172. In this state, the trailer 100 may be ready for transport.

At step 330, a user may tie down the vehicle using a strap assembly to more securely engage the vehicle with trailer 100.

Additional steps that may include, among other things, securing the vehicle to the trailer, attaching the trailer to a towing vehicle, and the like are also contemplated in the presently disclosed method. The steps disclosed herein are exemplary only and are not intended to limit the number of steps or scope of the method in any way.

It will be appreciated by those having skill in the art that the trailer 100 may be made of any suitable material, or combination of materials, whether natural or synthetic, including but not limited to metal, wood, plastic, or the like. It will also be appreciated that the trailer 100 may be of any shape or size to accommodate any number of vehicles to be towed, including larger or smaller vehicles than those pictured in the enclosed examples, and vehicles having four or more wheels. In such embodiments, the present disclosure contemplates additional wheel cradle(s) and/or wheel rest plates as needed to suit the vehicle to be towed. The present disclosure further contemplates dual axis configurations (or more) and/or alternative tongue assemblies to facilitate transport of heavier machinery where appropriate.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A trailer for towing vehicles, the trailer comprising:
    a. a tongue assembly, a ramp assembly, and a bed assembly, wherein the bed assembly spans substantially along a longitudinal axis between the tongue assembly and the ramp assembly;
    b. the ramp assembly further comprising:
        i. a ramp and a ramp pivot axis disposed substantially perpendicular to the longitudinal axis, wherein the ramp pivot axis divides the ramp into a forward ramp portion disposed proximate the bed assembly and a rear ramp portion opposite thereto;
        ii. wherein the ramp pivots about the ramp pivot axis; and
        iii. further wherein the forward ramp portion comprises one or more rear wheel rest plates;
    c. wherein the ramp is configured to pivot from a first position to a second position upon receipt of one or more rear wheels of a first vehicle at one or more of the wheel rest plates.

2. The trailer of claim 1 wherein a downward force provided by the one or more rear wheels pivots the ramp assembly from the first position to the second position.

3. The trailer of claim 1 wherein the second position of the ramp is substantially aligned with the longitudinal axis.

4. The trailer of claim 1 further comprising one or more rear wheel stops.

5. The trailer of claim 4, wherein the one or more rear wheel stops comprise a substantially semi-circular radius.

6. The trailer of claim 1, wherein the ramp pivot axis comprises a ramp pivot bar.

7. The trailer of claim 1, wherein the tongue assembly comprises a length adjustment mechanism for adjusting the length of the tongue assembly.

8. The trailer of claim 7, wherein the length adjustment mechanism comprises a tongue receiving member and a tongue bar sized to be received within the tongue receiving member.

9. The trailer of claim 8 wherein the tongue bar further comprises one or more adjustment holes that align with a lock point on the tongue receiving member for securing the tongue bar to the tongue receiver.

10. The trailer of claim 1 further comprising a manual maneuvering point to enable a user to manipulate the trailer by hand.

11. The trailer of claim 10, wherein the manual maneuvering point comprises a T-bar.

12. The trailer of claim 1 further comprising an adjustable stand.

13. The trailer of claim 1, wherein the bed assembly comprises a length sufficient to carry a second vehicle substantially between the tongue assembly and the first vehicle.

14. The trailer of claim 1 further comprising a securing mechanism, wherein the securing mechanism further comprises an attachment device for coupling the securing mechanism to at least one of the ramp or the vehicle.

15. The trailer of claim 14, wherein the securing mechanism comprises one or more of a ratchet strap mechanism, a strap, and a hook.

16. The trailer of claim 1 further comprising a hitch for coupling the trailer to a vehicle capable of towing the trailer.

17. A trailer for towing a vehicle having a plurality of wheels, the trailer comprising:
    a tongue assembly, a ramp assembly, and a front wheel set securing assembly spanning substantially along a longitudinal axis between the tongue assembly and the ramp assembly;
    the ramp assembly further comprising a ramp and a ramp pivot axis disposed substantially perpendicular to the longitudinal axis, wherein the ramp pivot axis divides the ramp into a forward ramp portion disposed proximate the front wheel set securing assembly and a rear ramp portion opposite thereto, wherein the ramp pivots about the ramp pivot axis; and further wherein the forward ramp portion comprises one or more rear wheel set rest plates corresponding to at least one wheel in a rear wheel set;

wherein the ramp is configured to pivot from a first position to a second position upon receipt of the rear wheel set at the one or more rear wheel rest plates.

18. The trailer of claim 17 wherein a downward force provided by the rear wheel set pivots the ramp from the first position to the second position.

19. A method of loading a vehicle onto a trailer, the method comprising the steps of:
   a. providing a trailer comprising:
      a tongue assembly, a ramp assembly, and a front wheel set securing assembly spanning substantially along a longitudinal axis between the tongue assembly and the ramp assembly;
      the ramp assembly further comprising a ramp and a ramp pivot axis disposed substantially perpendicular to the longitudinal axis, wherein the ramp pivot axis divides the ramp into a forward ramp portion disposed proximate the front wheel set securing assembly and a rear ramp portion opposite thereto, wherein the ramp pivots about the ramp pivot axis; and further wherein the forward ramp portion comprises one or more rear wheel set rest plates corresponding to at least one wheel in a rear wheel set;
   b. driving the vehicle from a starting position away from the trailer towards and up the ramp assembly;
   c. continuing to advance the vehicle up the ramp assembly and onto the trailer, guiding the rear wheel set to the one or more rear wheel set rest plates;
   d. engaging the rear wheel set to the one or more rear wheel set rest plates, thereby transitioning the ramp assembly from a first position to a second position.

20. The method of claim 19 further comprising the step of securing the trailer to a second vehicle capable of towing the trailer and the vehicle thereon.

\* \* \* \* \*